Sept. 5, 1967     C. GUDMUNDSON     3,339,217

PORTABLE AND TOWABLE BOAT TRAILER

Filed Jan. 18, 1965

INVENTOR.
CLARK GUDMUNDSON,
BY
*Linton and Linton*
ATTORNEYS.

United States Patent Office 3,339,217
Patented Sept. 5, 1967

3,339,217
PORTABLE AND TOWABLE BOAT TRAILER
Clark Gudmundson, 267 East 550 North,
Bountiful, Utah 84010
Filed Jan. 18, 1965, Ser. No. 426,131
6 Claims. (Cl. 9—1)

ABSTRACT OF THE DISCLOSURE

The present invention is concerned with a portable and towable boat trailer having a flat bottom which can conform to the bottom of a boat to be supported thereon, a pair of channel members each containing a floatable material therein and which channel members each have a side connected to an edge of said bottom. The bottom is resiliently supported on a wheel axle and has a tow bar extending from a pointed end of said bottom.

The principal object of the present invention is to provide a wheeled trailer which can be towed by a motored vehicle over a ground surface while securely supporting a boat thereon and which trailer has a relatively low center of gravity enabling it and the boat thereon to be safely towed at higher speeds and at less cost than known trailers and yet which trailer can be economically produced.

A further object of the invention is to provide a portable towable boat trailer which can employ wheels for supporting the same of the same or similar size to those used on the towing vehicle and yet which trailer has a low streamlined silhouette providing less wind drag when being towed for better road stability than conventional trailers.

A still further and important object of the invention is to provide a wheeled trailer for conveying boats, which is floatable upon being immersed in water and can be used as a floating dry dock for the boat, swimming and fishing platform for people, a starting platform for water skiers as well as providing a walk on the top thereof for reaching or getting out of a boat mounted thereon without the users getting wet.

Another important object of the invention is to provide a portable floatable boat trailer which is strong, durable, with a minimum of maintenance and which trailer fits the lower portion of the boat to retain and protect the boat while permitting the boat to enter or leave the rear end of the trailer with equal ease whether the trailer is floating on water, beached or attached to a tow vehicle.

Further objects of the invention will be in part obvious and in part pointed out in the following detailed description of the accompanying drawings, in which.

Figure 5:
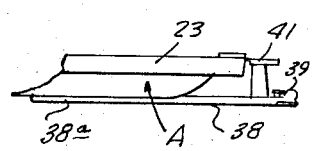

And FIG. 5 is a detail view, reduced size, of the front end of the trailer.

Referring now more particularly to the accompanying drawings in which like and corresponding parts are designated by similar reference characters, A generally indicates a bottom form of aluminum or a reinforced plastic, for example, fiberglass and which has a bottom half 1 whose marginal edge 2 slants upwardly, a keel trough provided by a side 3 extending downwardly from bottom half 1, a bottom 4 connecting side 3 and a side 5 which slants downwardly from a second bottom half 6 whose marginal edge 7 slants upwardly therefrom. Said bottom A can be formed from one piece of material and is shaped to mate with the bottom of a boat to be positioned thereon. Thus bottom halves 1 and 6 diverge upwardly from one another, have straight downwardly slanting rear edges 8 and 8a, respectively, while said marginal edges 2 and 7 curve longitudinally towards one another at the forward end, which is the right end of FIG. 1, to accommodate the bow end of a boat.

A channel shaped side member is generally indicated at 9 and has a flat top 11 from which diverge downwardly opposite sides 10 and 12. Said channel shaped side member is straight for part of its length, but curves laterally at its front portion 15. An upright flange 16 is provided at the front end of portion 15 for abutting a similar upright flange 17 on the front end of a similar, but oppositely directed second channel shaped side member generally designated by 21. Said flanges are joined by rivets 18, welding or other conventional means.

Side member 21 has a flat top 20 from which downwardly extends diverging sides 22 and 23. Said side member 21 is also straight for part of its length, but curves inwardly at its front portion 19 towards front portion 15 of side member 9.

Channel members 9 and 21 each have a rear wall 14 and 24, respectively, extending between and integral with or welded to the top and sides of their respective channel member. Said channel members 9 and 21 may be formed of a lightweight metal such as aluminum or titanium, a reinforced plastic such as fiberglass, wood boards joined in conventional manner such as screws or adhesives, plywood in joined pieces thereof or in one formed piece or other water resistant sheet materials.

Channel member 9 has the channel 13 thereof provided between top 11 and sides 10 and 12 filled with a floatable material 25 except at well portion 13a. Similarly channel member 21 has a channel 20a formed between top 20 and sides 22 and 23 which is also filled with a floatable material 25 except at well portion 20b. Said floatable material 25 may be any conventional material which will float on water, but preferably of a relatively light weight such as, for example, cork or a plastic such as styrofoam.

A pair of pneumatic tired wheels 27 and 28 are rotatably mounted on the opposite ends of axle 29.

A leaf spring 30 is pivotally connected at its ends to a pair of pins 31 each extending through one of a pair of inverted M-shaped brackets 32 fixedly attached to bottom portion 1 by welding, rivets, bolts, or the like. A second leaf spring 33 is pivotally connected at its ends to a pair of pins 34 each extending through one of a pair of inverted U-shaped brackets 35 fixedly attached to bottom portion 6 by welding, rivets, bolts or the like. Only one of each of said pins 31 and 34 and brackets 32 and 35 is shown in the drawings. Springs 30 and 33 are connected at their medial portion to axle 29 by bolts 36 and 37, respectively, extending therethrough or other conventional means. Said springs are positioned on bottom A so that wheels 27 and 28 partially extend into wells 20b and 13a respectively.

A tow bar 38 has a conventional trailer hitch coupling 39 connected to one end thereof for attachment to a mating element on a tow vehicle (not shown). The opposite end portion 38a of said tow bar is fixedly connected to channel bottom 4 by welding, bolts or the like and extends longitudinally from said channel bottom. An upright 40 is fixedly mounted on tow bar 38 by bolts or welding and has a top plate 41 for receiving a winch (not shown).

Marginal portions 2 and 7 overlap sides 10 and 22, respectively, and are connected thereto by a series of rivets or bolts 26 and 27, respectively.

It is to be appreciated that the configuration of bottom A and sides 9 and 21 can be changed from that shown in the drawings to conform to the bottom and lower sides of any of various type boats to be received therebetween.

Figure 1:
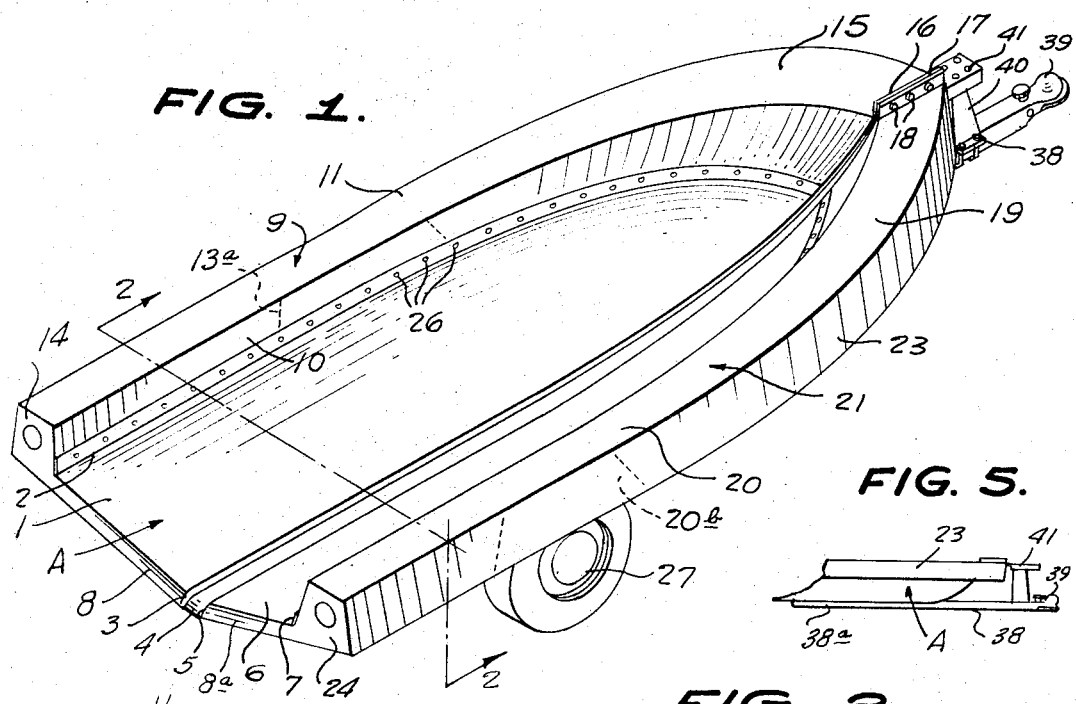
FIG. 1 is a top perspective view of the present boat trailer.
Figure 2:
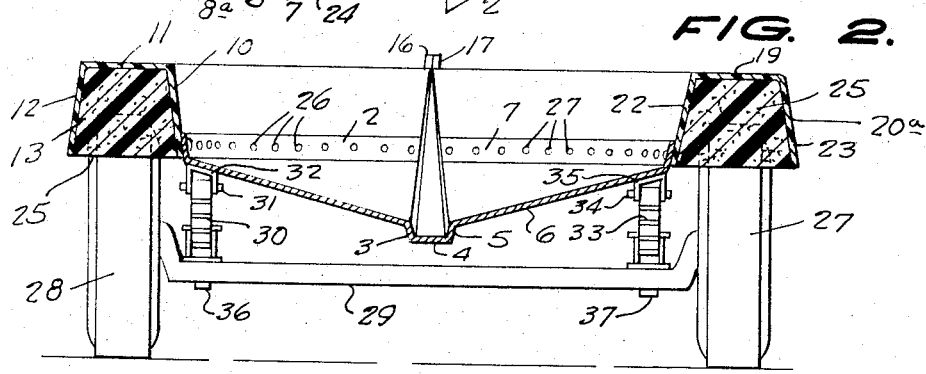
FIG. 2 is an enlarged cross-sectional view taken on line 2—2 of FIG. 1.
Figure 3:
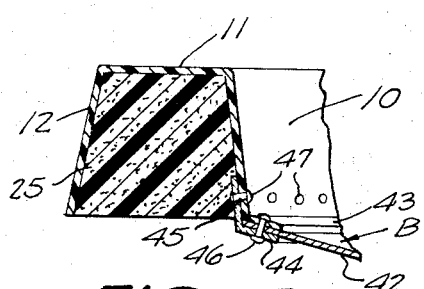
FIG. 3 is a further enlarged cross-sectional view of a part of a modified form of the present trailer.

FIG. 3 is a modified connection between the bottom and sides of the trailer which trailer is the same as shown in FIGS. 1, 2 and 5, except that bottom A does not have marginal portions 2 and 7 and is designated bottom B. Sides 10 and 22 have an integral slanting skirt 43 overlapping the top of bottom B and V-shaped brackets have portions 45 and 44 overlapping the inner face of side 10 and bottom face of bottom B respectively. Rivets 46 extend through and connect portion 44, bottom B and skirt 43 while rivets 47 extend through portion 45 and side 10 connecting the same. FIG. 3 only shows the connection between side portion 42 of bottom B and side 10, but the connection between the other side portion (not shown) of bottom B and side 22 is the same.

Figure 4:
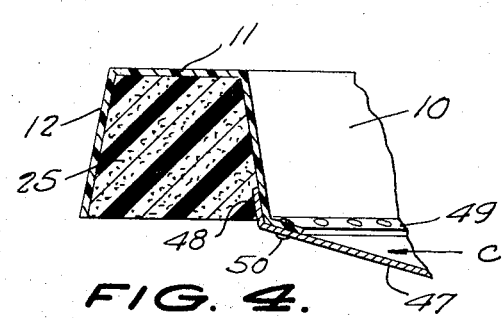
FIG. 4 is an enlarged cross-sectional view of a part of a second modified form of the present trailer.

FIG. 4 is a further modified connection between bottom A and sides 9 and 21. The trailer of this modification is the same as shown in FIGS. 1, 2 and 5 except that bottom A is designated C, is wider and has upwardly extending marginal portions 48 overlapping the inner face of sides 10 and 22. Said sides 10 and 22 have integral slanting skirts 49 overlapping the top face of bottom C and connected thereto by a series of rivets 50 extending therethrough. FIG. 4 only shows the connection between side portion 47 of bottom C and side 10, but the connection between the other side portion (not shown) of bottom C and side 22 is the same.

The top portions 11, 15 and 20, 19 provide walkways for the user to move around the trailer when the trailer is in the water.

In the use of the present trailer, coupling 39 can be attached to a ball hitch, not shown, attached to a tow vehicle whereby the trailer with or without a boat may be transported from place to place. If the trailer is backed into the water, bottoms A, B or C will submerge until material 25 will float the trailer and a boat can be floated on or off the trailer over edges 8 and 8a. When the boat is on the trailer it is retained between the sides 10 and 22 and the bow of the boat attached to upright 40 by rope, cable, or the like, or a winch when on said upright and the boat is retained against movement and protected thereby.

The boat can be driven on or off the trailer when in the water, under its own power or manually, or the boat when partially on the trailer can be used to move the trailer to a loading ramp, water's edge or the like. Also the trailer when in the water can be used as a swimming or fishing platform for users thereof or water skiers can stand on the bottom A, B, or C to be towed onto the water or the trailer can be used as a boat or wading pond for children.

Figure 6:
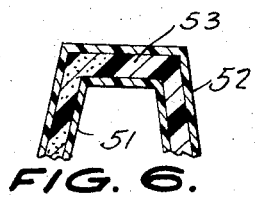

As shown in FIG. 6, the channel members 9 and 22, can be formed of two U-shaped sheets of rigid material, 51 and 52, as previously described for channel members 9 and 21, having a layer 53 of a buoyant material such as cork, wood, or a plastic therebetween or the three pieces 51–53 inclusive may be expanded Royalite produced by the United States Rubber Company. Channel members 9 or 21 produced in accordance with FIG. 6 would not require the buoyant filler material 25 as shown in FIGS. 3 and 4, but could have the same therein.

Figure 7:
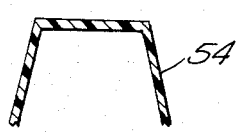

Also, the channel numbers 9 and 21 can be produced using a non-buoyant material such as a lightweight metal for example, aluminum. This is indicated in FIG. 7 where is shown in cross-section an example of a channel number 54 produced of a non-buoyant material. Using such channel numbers would permit the entire trailer to further sink into the water than the trailers previously described but the bottom A as well as the air trapped under the number 54 prevents the trailer from completely sinking.

The channel member as shown in FIG. 6 or FIG. 7 would have a thickness of ½" to 1".

The present trailer is capable of considerable modification and such changes thereto as come within the appended claims is deemed a part of the invention.

I claim:

1. A towable boat trailer comprising a bottom having a rear edge, a pointed end and side edges extending from said rear edge to said pointed end, a pair of channel members each having a flat top with sides extending therefrom providing an open bottom channel therebetween, each of said channel members having one of its sides extending along and fixedly joined to one of said bottom side edges, a pair of abutting joined flanges each fixedly joined to one of said channel side members at the pointed end of said bottom, a floatable material positioned in said open bottom channels, an axle resiliently connected to said bottom, wheels rotatably mounted on said axle and a tow bar fixedly joined to said bottom and extending therefrom.

2. A towable boat trailer comprising a bottom having a rear edge, a pointed end and side edges extending from said rear edge to said pointed end, a pair of channel members each having a flat top with sides extending therefrom providing an open bottom channel therebetween, each of said channel members having one of its sides extending along and overlapping one of said bottom side edges, means fixedly joining said overlapping bottom side edges and said one of said channel member sides, a floatable material positioned in said open bottom channels, an axle resiliently connected to said bottom, wheels rotatably mounted on said axle and a tow bar fixedly joined to said bottom and extending therefrom.

3. A towable boat trailer comprising a bottom having a rear edge, a pointed end and side edges extending from said rear edge to said pointed end, a pair of channel members each having a flat top with sides extending therefrom providing an open bottom channel therebetween, one side of each of said channel members having a slanting skirt overlapping one of said bottom side edges, means fixedly joining said overlapping skirts and bottom side edges, a floatable material positioned in said open bottom channels, an axle resiliently connected to said bottom, wheels rotatably mounted on said axle and a tow bar fixedly joined to said bottom and extending therefrom.

4. A towable boat trailer comprising a bottom having a rear edge, a pointed end and side edges extending from said rear edge to said pointed end, a pair of channel members each having a flat top with sides extending therefrom providing an open bottom channel therebetween, one side of each of said channel members having a slanting skirt overlapping one face of said bottom side edges, elongated members overlapping the other face of said bottom side edges and said one of said channel member sides, means fixedly joining said bottom, said elongated members and said one of said channel member sides, a floatable material positioned in said open bottom channels, an axle resiliently connected to said bottom, wheels rotatably mounted on said axle and a tow bar fixedly joined to said bottom and extending therefrom.

5. A towable boat trailer comprising a bottom having a rear edge, a pointed end and side edges extending from said rear edge to said pointed end, a pair of channel members each having a flat top with sides extending therefrom providing an open bottom channel therebetween, one side of each of said channel members having a slanting skirt overlapping said bottom, said bottom having slanting marginal portions each overlapping said one side of one of said channel members, means fixedly joining at least said slanting skirts and said bottom, a floatable material positioned in said open bottom channels, an axle resiliently connected to said bottom, wheels rotatably mounted on said axle and a tow bar fixedly joined to said bottom and extending therefrom.

6. A towable boat trailer comprising a bottom having side edges and a pointed end, a pair of channel side members each extending along and fixedly joined to one of said bottom side edges, floatable material being positioned in said channel side members, said pair of channel side members each consisting of superposed sheets of rigid material with said floatable material positioned between said sheets of rigid material, an axle resiliently connected to said bottom, wheels rotatably mounted on said axle and a tow bar fixedly joined to said bottom and extending therefrom.

References Cited

UNITED STATES PATENTS

| | | | |
|---|---|---|---|
| 3,004,771 | 10/1961 | Moore | 9—1 X |
| 3,126,855 | 3/1964 | Freeburg | 9—1 X |
| 3,165,216 | 1/1965 | Macksoud et al. | 9—1 X |
| 3,224,019 | 12/1965 | Gudmundson | 9—1 X |

MILTON BUCHLER, *Primary Examiner.*

T. M. BLIX, *Assistant Examiner.*